July 9, 1963  J. DOBBIE  3,097,340
GENERATING SYSTEM PRODUCING CONSTANT WIDTH PULSES FROM
INPUT PULSES OF INDETERMINATE HEIGHT AND DURATION
Filed May 31, 1961  4 Sheets-Sheet 1

WITNESSES:
Bernard R. Giegucz
Lawrence L. Lerner

INVENTOR
James Dobbie

BY
Paul E. Friedemann
ATTORNEY

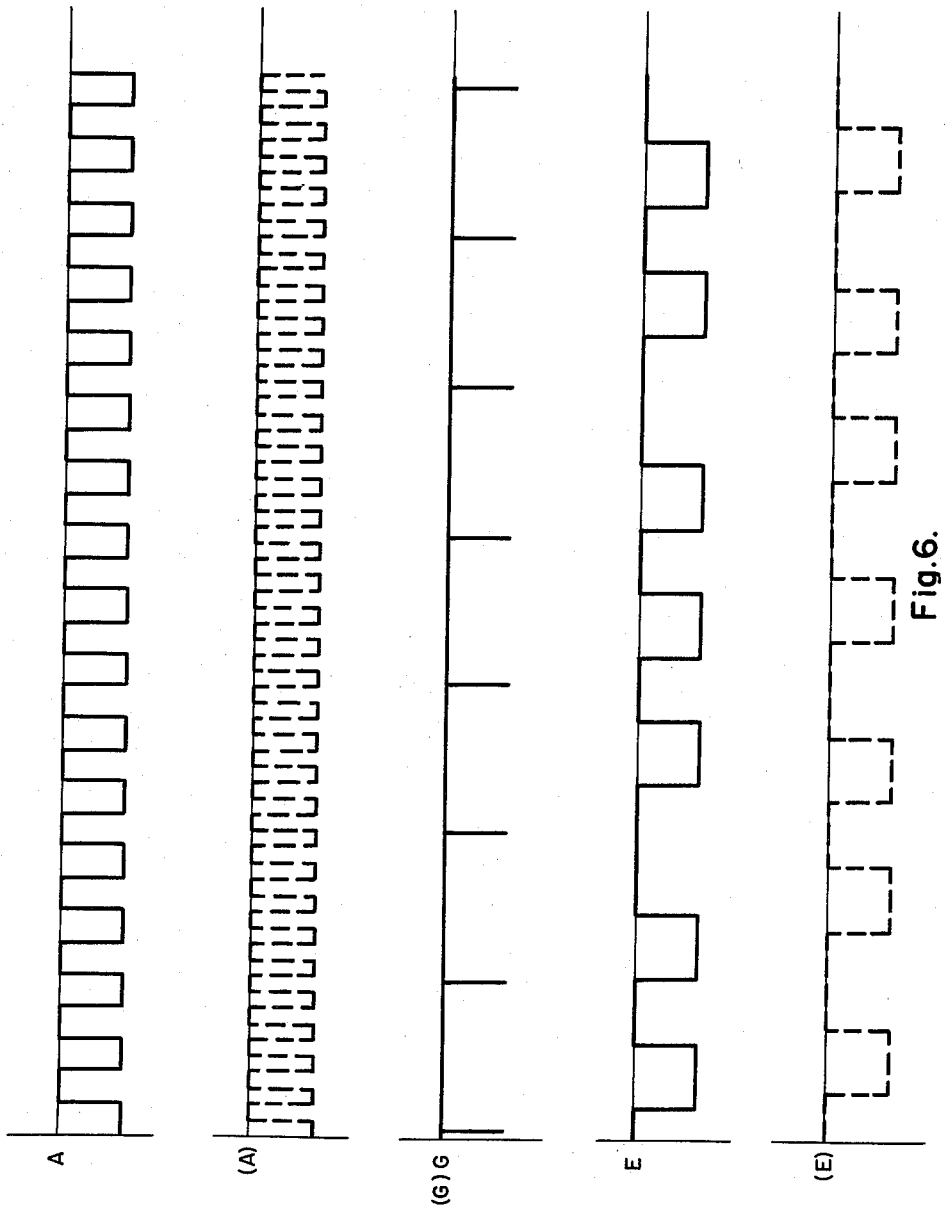

United States Patent Office 3,097,340
Patented July 9, 1963

3,097,340
GENERATING SYSTEM PRODUCING CONSTANT WIDTH PULSES FROM INPUT PULSES OF INDETERMINATE HEIGHT AND DURATION
James Dobbie, Williamsville, N.Y., assignor to Westinghouse Electric Corporation, East Pittsburgh, Pa., a corporation of Pennsylvania
Filed May 31, 1961, Ser. No. 113,897
7 Claims. (Cl. 328—63)

In general, this invention relates to a simple system for the generation of controlled width pulses. More particularly, it relates to a system of converting pulses of an indeterminate height and duration into pulses whose width and amplitude are held to a very accurate predetermined value.

Frequently, it is required to convert a pulse train into a D.-C. voltage whose magnitude is directly proportional to the pulse rate. One method of doing so is to generate from each pulse another pulse whose width and amplitude are held to very accurate predetermined values. In most cases, the latter pulse would be rectangular and much larger in width than the first pulse. If this latter pulse train were fed into a form of integrator, it can be seen that a voltage or current signal could be obtained whose amplitude was directly proportional to the pulse rate. The biggest problem has been to control the pulse width and it is for this purpose that the presently disclosed invention has been made.

Therefore, it is the general object of this invention to overcome the foregoing difficulties by the provision of a more simple and more accurate system for the generation of controlled width pulses.

Another object of the invention is to provide a better and more simple system for the generation of constant width pulses which utilizes static switching elements.

Another object is to provide a simple and more accurate device for obtaining constant width pulses from an input pulse train which device utilizes a crystal oscillator as a source of very accurate frequency signals.

Another object is to provide an improved system for the generation of constant width output pulses from an input pulse train where the frequency of the output pulses is proportional to the frequency of the input pulses and the spacings between said output pulses are approximately equal.

The aforesaid objects of the invention, and other objects which will become apparent as the description proceeds, are achieved by providing a circuit for generating output pulses of constant width and amplitude from a varying input pulse train. The input pulse signals open an inhibit gate and allow the positive rise of a square-wave reference signal from a crystal oscillator to trigger a flip-flop circuit so as to get an output signal. The next succeeding positive rise of the input from the crystal oscillator will trigger the flip-flop the other way bringing the output to zero and resetting the input flip-flop circuit so as to close the inhibit gate. Any succeeding input pulses will start a repetition of the same operation. In order to keep the spacing between the output pulses approximately equal, the crystal oscillator frequency could be increased and a frequency divider could be placed between the inhibit gate and the output flip-flop to achieve the desired result.

The apparatus of this invention will become more readily apparent by reference to the attached drawings, in which:

FIGURE 6 is a voltage-time diagram which compares the operation of the circuits shown in FIGURES 1 and 4.

Figure 1:
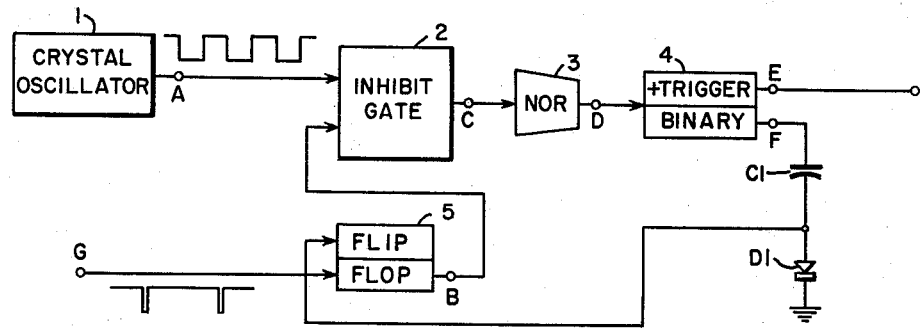
FIGURE 1 is a diagrammatic showing of one embodiment of the present invention.
Figure 2:
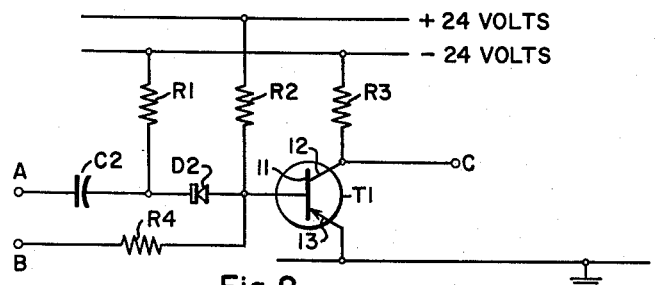
FIGURE 2 is a schematic showing of an inhibit gate circuit which could be utilized in the circuit shown in FIGURE 1.

With reference to FIGURE 1, there is shown the basic system embodying the present invention. A crystal oscillator 1 having an output terminal A is utilized to obtain a very accurate frequency signal. This is necessary when it is realized that the output of the system must be capable of voltage accuracies in the region of 0.05%. The crystal oscillator 1 feeds an inhibit gate circuit 2. One embodiment of the inhibit gate circuit 2 is shown in FIGURE 2 and will be explained below. The inhibit gate circuit 2 is controlled by the output of a bistable device 5 whose output terminal is B. The inhibit gate circuit operates such that when there is an output signal on terminal B of the flip-flop 5, there will be no output at the terminal C of the inhibit gate circuit 2. However, when there is no output signal on the output terminal B, the positive rises appearing at the terminal A will cause pulses to appear at the output terminal C. This pulse is inverted by the NOR element 3 and it appears in its inverted form at the output terminal D of the NOR element 3.

The NOR element 3 is per se well known in the art and a typical embodiment is shown in the article "The Transistor NOR Circuit," by W. D. Rowe, in 1957 IRE Wescon Convention Record, part 4, pages 231 to 245. This article also shows, on pages 244 and 245, embodiments of devices which might be utilized as the bistable flip-flop element 5 or the bistable trigger binary element 4.

The output signal of the NOR element 3 is fed into the trigger binary bistable device 4 which may be of the type mentioned above. The trigger binary device 4 has two output terminals E and F. Pulses received at the input of the trigger binary device 4 switch the output signal condition of the terminal E to that previously held by terminal F, and vice versa. The output terminal F is connected through a capacitor C1 to a second input of the bistable device 5. This second input is connected to ground through a diode D1. The output signal conditions at the terminal B of the flip-flop device 5 is changed from one state to another by the appearance of a negative pulse input at either of its two input terminals. The first input terminal G receives pulses which are to be converted by the system into output pulses appearing at E which will each have constant height and duration at a frequency proportional to the frequency of the input pulses arriving at the terminal G.

FIGURE 2 shows a typical inhibit gating circuit which might be used in the present invention. A transistor T1 having a base 11, collector 12 and emitter 13 is connected such that the emitter 13 is at ground potential. The collector 12 is connected through a resistance R3 to a negative voltage supply, in this case —24 volts. The base 11 is connected through a resistance R2 to a positive voltage supply, in this case 24 volts. The base 11 is also connected through a resistance R4 to the output terminal B of the flip-flop 5. The base 11 has a third connection through a diode D2 and resistance R1 to the negative supply, —24 volts. The diode D2 is also connected through a capacitor C2 to the output terminal A of the crystal oscillator 1.

The inhibit gating circuit shown in FIG. 2 operates as follows. With no input at terminal B, the transistor T1 is saturated and the collector voltage C is zero. This is due to the inequality of the resistance values of resistors R1 and R2. Resistor R1 is considerably smaller in value than resistor R2 and therefore more negative current is fed to the base 11 of the transistor T1 than positive current. This negative current is sufficient to cause the transistor T1 to saturate.

The input signal from terminal A is a square wave pulse of constant frequency which is differentiated by the capacitor C2. When the square wave input signal changes from a higher to a lower potential, a negative pulse is fed through capacitor C2 which simply drives the transistor T1 more into saturation. However, when there is a rise in potential of the square wave, from a lower to a higher potential, a corresponding positive current is fed through resistor R1 which bucks the negative current being fed through resistor R1 from the —24 volt supply. When this occurs, more positive current is being fed into the base 11 than negative current and the transistor T1 goes into a cutoff state. During this cutoff state, the output of the transistor T1 at terminal C rises to approximately the negative —24 volts potential. Since the input positive current is caused by the differentiation of the input square wave, the positive current appears only as a pulse signal and the output signal at terminal C is also a pulse output signal. However, this pulse signal will appear only when there is no input signal on the terminal B and occurs each time there is a rise, or at the leading edge of the square wave signal supplied by the crystal oscillator. If the output signal at terminal B of the flip-flop device 5 is a negative voltage signal, it will keep the transistor T1 in saturation, even when positive pulses of current are supplied from the crystal oscillator. Thus, the output signal at the oscillator terminal C of the transistor T1 will remain at ground potential so long as the output of the flip-flop device 5 is a negative voltage signal.

Figure 3:
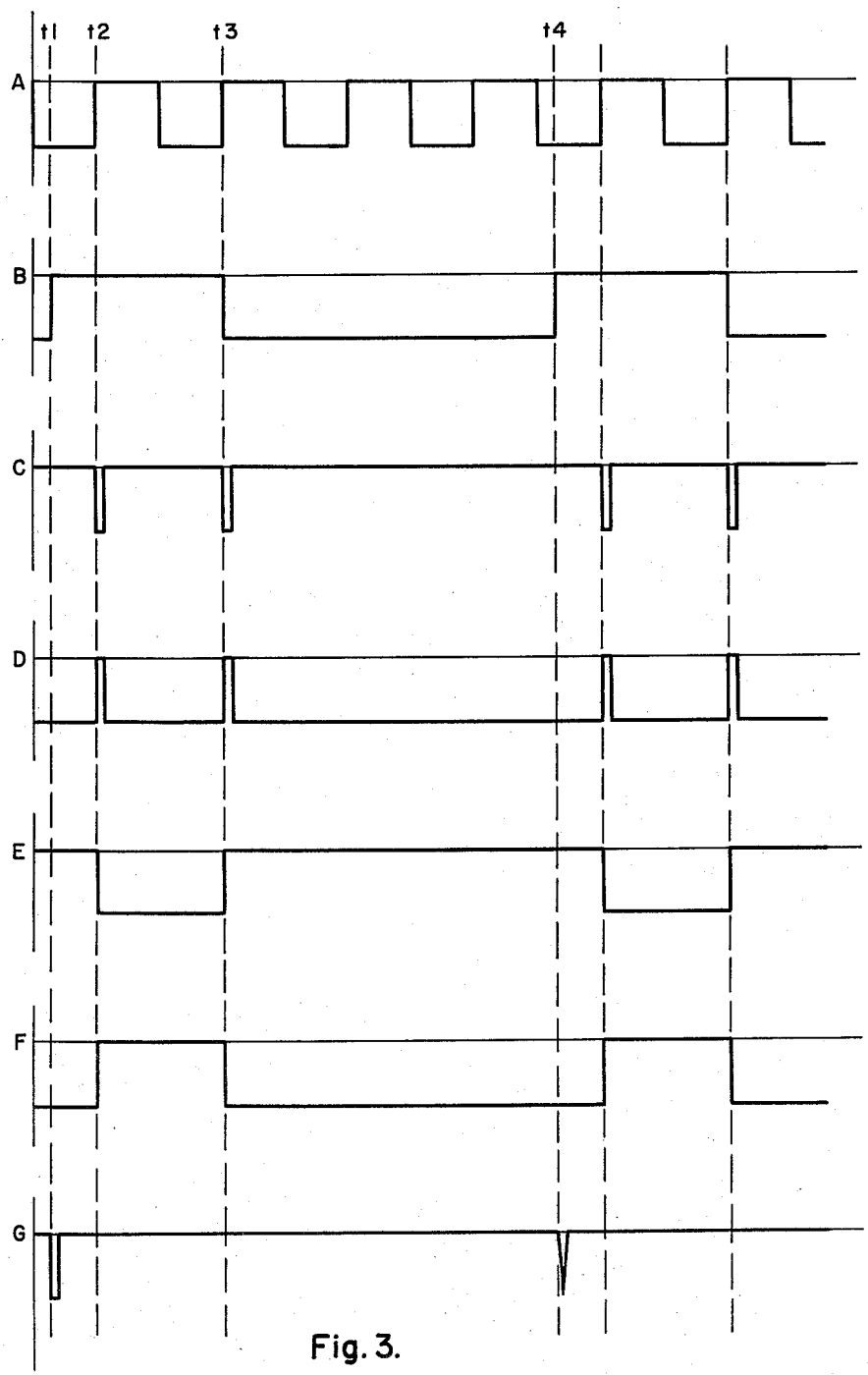
FIGURE 3 is a voltage-time diagram which more clearly illustrates the operation of the circuit shown in FIGURE 1.

The circuit of FIGURE 1 will be explained with reference to the voltage-time diagrams shown in FIGURE 3. The initial conditions for the circuit with no input at G are as follows: B is at a negative value, C is at ZERO, D is the complement of C, and is at a negative value, E is at ZERO, and F the complement of E is at a negative value. When a pulse arrives at terminal G, it immediately switches the output signal condition of B to its second condition which is a ZERO output. This occurs at time *t*1. When the first rise in level of the square rate input from the crystal oscillator appears, it causes a pulse to appear at the output C of the inhibit gate 2. This occurs at time *t*2. The negative pulse at terminal C is inverted by the NOR element 3. It appears as a positive going pulse at terminal D. This positive going pulse switches the trigger binary device 4 so that there is then a negative output signal at terminal E and a ZERO output signal at terminal F. The voltage states of terminals B, E and F remain in the above-mentioned states until the next rise in the square wave input from the crystal oscillator. This positive going pulse arrives at time *t*3 and causes a pulse to appear at C. This pulse in its inverted form switches the trigger binary device again so that the outputs at terminals E and F switch values. It will be noted that the output at terminal F at time *t*2 went from a negative value to zero, or, in other words, a positive going rise. This means that positive current flowed out of the terminal F through the capacitor C1 and the diode D1 to ground. The diode D1 shunted this positive going current away from the flip-flop device 5. When, at time *t*3 the output at the terminal F went from zero to a negative value, a negative pulse of current flowed from terminal F. This current is proportional to the differentiated output voltage signal at terminal F and was applied to the flip-flop 5 to trigger it. This changed the state of the flip-flop device 5 and the output voltage at the terminal B from ZERO to a negative value. The negative voltage on the gate of the inhibit gate circuit 2 prevented any more pulses from appearing at the output terminal C. This condition continued until a second pulse arrived at terminal G at time *t*4. When this occurred, the operation repeated itself.

It can be seen from this analysis that for every pulse received at input terminal G, an output pulse appears at terminal E whose height is fixed and whose duration is one full cycle of the crystal oscillator frequency, i.e, the time *t*3–*t*2. Since the frequency of the crystal oscillator is very accurate, the duration of the output pulse will also be very accurate.

Figure 4:
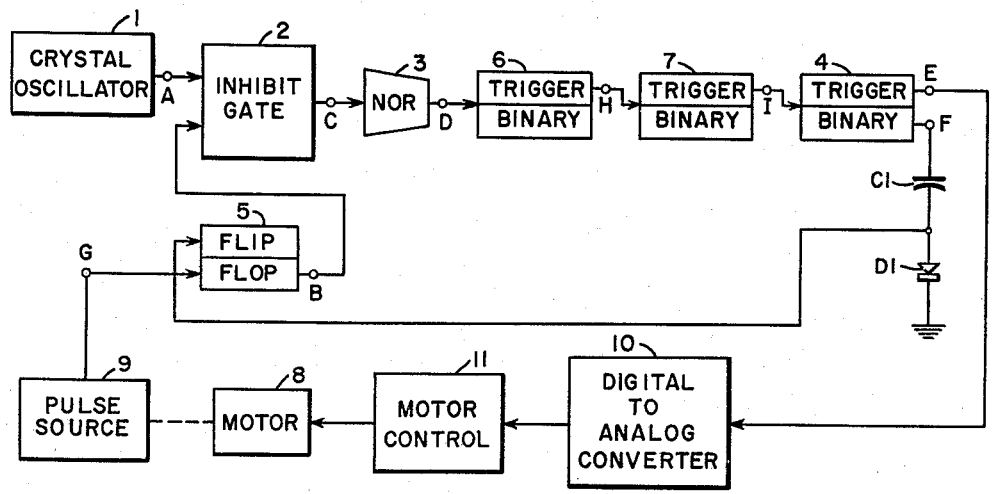
FIGURE 4 is another embodiment of the present invention shown in operation with a motor control circuit.

Referring to FIGURE 4, there is shown a modification of the circuit described in FIGURE 1 utilized in a motor speed control system. In this system a motor 8 whose speed is to be controlled is connected to a pulse signal transmitter 9 which transmits pulse of indeterminate height and duration proportional to the speed of the motor 8. The output of the pulse signal transmitter is connected to the terminal G of the pulse transforming circuit. For every pulse signal supplied to terminal G a corresponding pulse of constant height and duration appears at terminal E of the pulse transforming circuit. The output signal from terminal T2 is applied to a digital to analog converter 10 whose output signal is proportioned to the speed of the motor. This analog signal is applied against a speed reference signal in a motor controller 11 which acts to maintain the speed of the motor at the reference value.

The pulse transforming circuit shown in FIGURE 4 differs from the circuit of FIGURE 1 in that a frequency divider circuit is placed between the output terminal D of the NOR element 3 and the input of the trigger binary 4. The frequency divider network consists of two trigger binary devices 6 and 7 having output terminals H and I, respectively. While various schemes may be utilized to divide the pulses received at the output terminal D, the present invention utilizes two binary trigger devices for simplicity and uniformity with the rest of the circuit.

Figure 5:
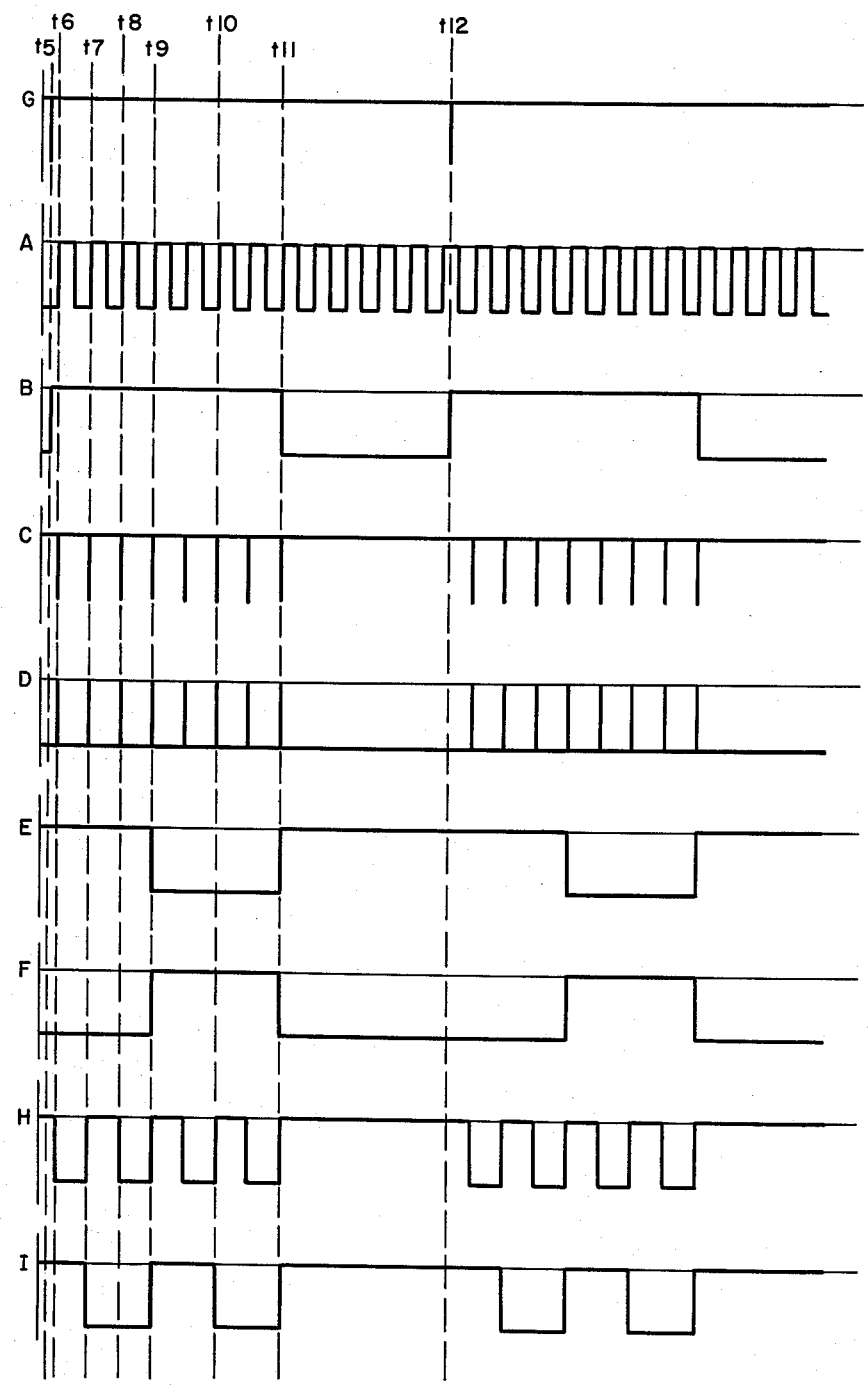
FIGURE 5 is a voltage-time diagram which better illustrates the operation of the circuit shown in FIGURE 4.

The advantages of using a frequency divider placed in this portion of the circuit can best be seen by reference to FIGURE 5, which explains the operation of the circuit of FIGURE 4, and to FIGURE 6 which compares the operation of the circuit shown in FIGURE 1 to a modification of the circuit shown in FIGURE 4.

Referring now to FIGURE 5, there is therein shown voltage-time diagrams of the voltage signals present at various points in the circuit. The initial conditions are the same as those discussed with reference to FIGURE 3, with the additional information that the initial output voltage at terminals H and I is zero. At time *t*5, a pulse arrives at terminal G. This pulse switches the flip-flop trigger binary 4 so that the output signal at terminal E At time *t*6, the positive rise of the voltage at terminal A causes a pulse to appear at terminal C, the output of the inhibit gating means 2. This is inverted by the NOR element 3 into a positive pulse at terminal D. This positive pulse at D switches trigger binary 6 so that its output at H goes from ZERO to a negative value. Since the output at terminal H is a negative going value, it will not trigger the next succeeding binary 7 and the rest of the circuit will remain in the condition prior to time *t*6. At time *t*7, when the next positive going rise appears at the crystal oscillator output terminal A, another pulse is transmitted to terminal C and inverted at terminal D. This again switches the trigger binary 6 from the negative value to ZERO. Since this is a positive rise, it will act to trigger the next trigger binary 7 and cause the output at terminal I to go from ZERO to a negative value. This negative going current will not act on trigger binary 4 and the rest of the circuit will remain unaffected. Following the above-mentioned analogies, at time *t*8 a pulse will appear at terminal D to return the output of trigger binary 6 to a negative value and the trigger binary 7 will not be affected. At time *t*9, the positive going rise from the crystal oscillator appearing at terminal A will cause a pulse at terminal D of the NOR element 3. This will change the output of the trigger binary 6 from a negative value to ZERO, which positive going current will trigger binary device 7 from a negative value to ZERO.

This last-mentioned positive going current will switch trigger binary 4 so that the output signal at termnial E will change from ZERO to a negative value and the output signal at terminal F will change from a negative value to ZERO. This last-mentioned positive going current will be shunted to ground through the capacitor C1 and diode D1. Two full cycles of the crystal oscillator frequency later, at time $t10$, the leading edge of the crystal oscillator signal causes a pulse to appear at terminal D which switches trigger binary 7 back to a neagtive value through trigger binary 6. Two more full cycles of the crystal oscillator frequency later, at time $t11$, another pulse signal appears at the output terminal D of NOR element 3. This causes the signal at output terminal I of trigger binary 7 to change from a negative value to ZERO, which, in turn, triggers the bistable device 4 and changes the outputs at terminal E from a negative value to ZERO. The voltage at terminal F switches from ZERO to a negative value sending a negative pulse through the differentiating capacitor C1 to the flip-flop device 5. This changes the output signal condition of the flip-flop device 5 from ZERO to a negative value and effectively gates the inhibit gating means so that no more positive pulses will appear at the terminal C until another pulse, at time $t12$, arrives at the input terminal G of the flip-flop device 5. When this occurs, the operation as mentioned above repeats itself.

FIGURE 6 is a voltage-time diagram comparing the operation of the circuits shown in FIGURE 4 and FIGURE 1 with the same input pulse signals arising at terminal G. For simplicity purposes, one of the frequency dividing trigger binaries in FIGURE 4 has been removed so as to better illustrate the comparison. It should be noted that the frequency of the crystal oscillator in the circuit shown in FIGURE 4 is twice the frequency of the crystal oscillator shown in FIGURE 2. However, the frequency divider network divides the pulses received at the NOR element output terminal D by two so that the duration of the output pulses at the terminal E are exacly equal in both cases. The frequency divider network improvement would not be necessary if the input pulses arriving at terminal G were a subharmonic of the crystal oscillator frequency. This would be so because then the output pulses measured at terminal E would be spaced equally apart. However, since the input pulses arriving at terminal G may not be a subharmonic of the crystal oscillator frequency, unequal spacing occurs between the output pulses at terminal E. In order to lessen this irregularity of spacing, the frequency divider network was necessary. The reason for attempting to keep the spacing as approximately equal as possible can be seen when one considers that these output pulses will be used to feed an integrating circuit to give an analog output voltage proportional to the speed. Great irregularities of spacing will cause variations in the analog output voltage when there has been no appropriate variation in frequency of the input pulse signals.

In FIGURE 6, the dotted line drawings refer to the values of voltage at the particular point in FIGURE 4, and the black line curves refer to the voltages in the FIGURE 1 embodiment. In FIGURE 6, the input at terminal G is plotted for both circuits. It can be seen from the figure that the output voltage at terminal E for the circuit of FIGURE 1 is far less regularly spaced than the output voltage at terminal E for FIGURE 4. This has been accomplished with only a frequency division of two. When this frequency division is raised to 8, 16 or 32, the spacing between the output pulses appearing at terminal E will become appropriately more equal.

While some preferred embodiments of the invention have been illustrated and described in detail, it is to be particularly understood that the invention is not intended to be limited thereto or thereby.

I claim as my invention:

1. In controlled pulse signal providing apparatus operative with input pulse signals, the combination of a source of reference frequency signals, signal gating means operative when open with said signal source to provide a pair of control signals having a predetermined relationship to said reference signals, first control means operative to open said signal gating means in response to each of said input pulse signals, and second control means for providing a controlled pulse output signal in response to said control signals, with said first control means being responsive to said one control signal.

2. In controlled pulse signal providing apparatus operative with input signals, the combination of a source of reference signals, signal gating means, first control means operative to open said signal gating means in response to each of said input pulse signals, said signal gating means when open being operative with said signal source to provide at least a pair of control signals having a predetermined relationship to said reference signals, and second control means for providing a controlled pulse output signal in response to at least said pair of control signals, with said control signals being additionally operative to close said signal gating means after a controlled pulse output signal has been provided at the output of said second control means.

3. In a system for converting input pulse signals of a given frequency into output pulse signals of constant height and duration at a frequency proportional to the given frequency, the combination of an inhibit gating means, an alternating current source of constant frequency feeding said inhibit gating means, a first bistable device having two output signal conditions and receiving said input pulse signals to change the output signal condition of said first bistable device, said inhibit gating means being controlled by the output signal of said first bistable device and having no output signal when the output signal of said first bistable device is in one condition and supplying an output pulse signal at the same time during each cycle of current supplied from said alternating current source when the output signal of said first bistable device is in a second condition, a second bistable device having two output signal conditions and changing from one output signal condition to the other output signal condition whenever a pulse signal is supplied to the input of said second bistable device from the said inhibit gating means, and means for supplying every second pulse signal from said inhibit gating means to said first bistable device to change the output signal condition of said first bistable device whereby the height and duration of the output pulse signals from the second bistable device will be constant and their frequency will be proportional to the frequency of the input pulse signals.

4. In a system for converting input pulse signals of a given frequency into output pulse signals of constant height and duration at a frequency proportional to the given frequency, the combination of an inhibit gating means, an alternating current source of constant frequency feeding said inhibit gating means, a first bistable device having two output signal conditions and receiving said input pulse signals to change the output signal condition of said first bistable device, said inhibit gating means being controlled by the output signal of said first stable device and having no output signal when the output signal of said first bistable device is in one condition and supplying an output pulse signal at the same time during each cycle of current supplied from said alternating current source when the output signal of said first bistable device is in a second condition, a second bistable device having two output signal conditions and changing from one output signal condition to the other output signal condition whenever a pulse signal is supplied to the input of said second bistable device from the said inhibit gating means, and means for converting every second change in the output signal condition of the said second bistable device into a pulse signal and applying it to said first bistable device to change the output signal condition of said first bistable device whereby the height and duration of the output pulse signals from the second bistable device will be constant and their frequency will be proportional to the frequency of the input pulse signals.

5. In a system for converting input pulse signals of a given frequency into output pulse signals of constant height and duration at a frequency proportional to the given frequency, the combination of an inhibit gating means, an alternating current source of constant frequency feeding said inhibit gating means, a first bistable device having two output signal conditions and receiving said input pulse signals to change the output signal condition of said first bistable device, said inhibit gating means being controlled by the output signal of said first bistable device and having no output signal when the output signal of said first bistable device is in one condition and supplying an output pulse signal at the same time during each cycle of current supplied from said alternating current source when the output signal of said first bistable device is in a second condition, a second bistable device having two output signal conditions and changing from one output signal condition to the other output signal condition whenever a pulse signal is supplied to the input of said second bistable device from the said inhibit gating means, capacitive means connected between the output of said second bistable device and the input of said first bistable device, and a grounded unidirectional conducting device connected to the input of said first bistable device whereby every second change in the output signal condition of said second bistable device causes a pulse to be applied to said first bistable device changing its output signal condition and maintaining the height and duration of the output pulse signals from the second bistable device at a constant value while causing the frequency thereof to be proportional to the frequency of the input pulse signals.

6. In a system for converting input pulse signals of a given frequency into output pulse signals of constant height and duration at a frequency proportional to the given frequency, the combination of an inhibit gating means, an alternating current source of constant frequency feeding said inhibit gating means, a first bistable device having two output signal conditions and receiving said input pulse signals to change the output signal condition of said first bistable device, said inhibit gating means being controlled by the output signal of said first bistable device and having no output signal when the output signal of said first bistable device is in one condition and supplying an output pulse signal at the same time during each cycle of current supplied from said alternating current source when the output signal of said first bistable device is in a second condition, a pulse frequency divider means supplying one pulse output signal for a given number of pulse signals received from said inhibit gating means, a second bistable device having two output signal conditions and changing from one output signal condition to the other output signal condition whenever a pulse signal is supplied to the input of said second bistable device from said pulse frequency divider means, and means for converting every second change in the output signal condition of the said second bistable device into a pulse signal and applying it to said first bistable device to change the output signal condition of said first bistable device whereby the height and duration of the output pulse signals from the second bistable device will be constant and their frequency will be proportional to the frequency of the input pulse signals.

7. In a system for converting input pulse signals of a given frequency into output pulse signals of constant height and duration at a frequency proportional to the given frequency, the combination of an inhibit gating means, a square wave current source of constant frequency feeding said inhibit gating means, a first bistable device having two output signal conditions and receiving said input pulse signals to change the output signal condition of said first bistable device, said inhibit gating means being controlled by the output signal of said first bistable device and having no output signal when the output signal of said first bistable device is in one condition and supplying an output pulse signal when the leading edge of the square wave signal supplied from said square wave current source is applied to the inhibit gating means and the output signal of said first bistable device is in a second condition, a second bistable device having two output signal conditions and changing from one output signal condition to the other output signal condition whenever a pulse signal is supplied to the input of said second bistable device from the said inhibit gating means, and means for supplying every second pulse signal from said inhibit gating means to said first bistable device to change the output signal condition of said first bistable device whereby the height and duration of the output pulse signals from the second bistable device will be constant and their frequency will be proportional to the frequency of the input pulse signals.

References Cited in the file of this patent
UNITED STATES PATENTS
2,885,662    Hansen _____ May 5, 1959